J. B. TORGESON.
ATTACHMENT FOR FILM PACK CAMERAS.
APPLICATION FILED SEPT. 1, 1920.
1,431,851.
Patented Oct. 10, 1922.
2 SHEETS—SHEET 1.
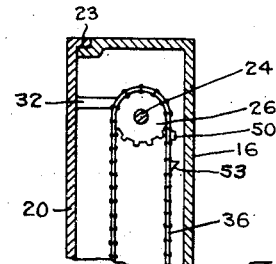
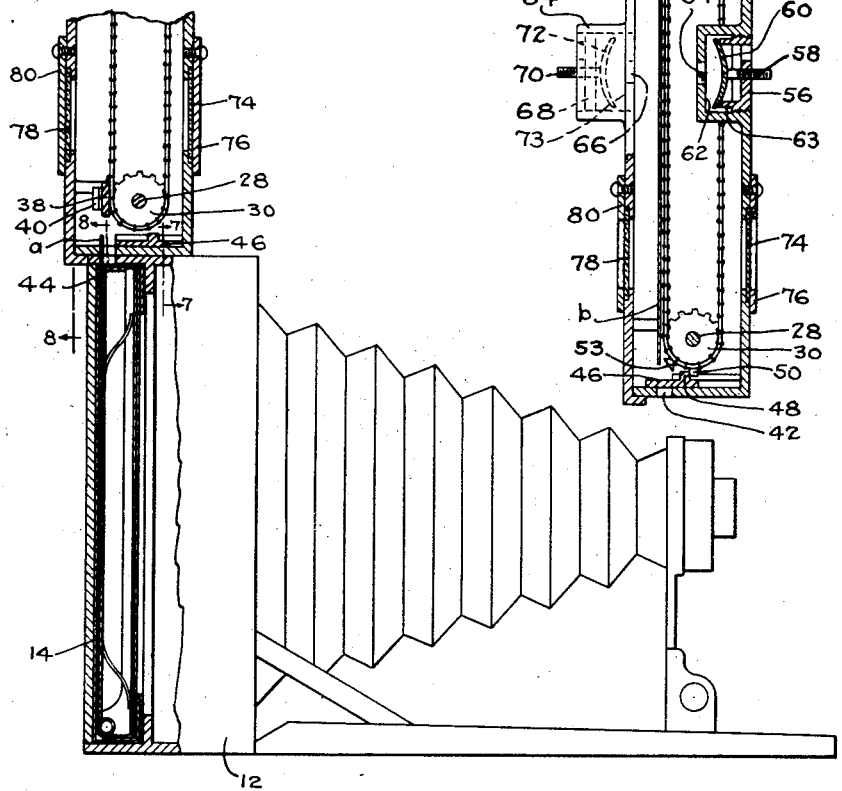
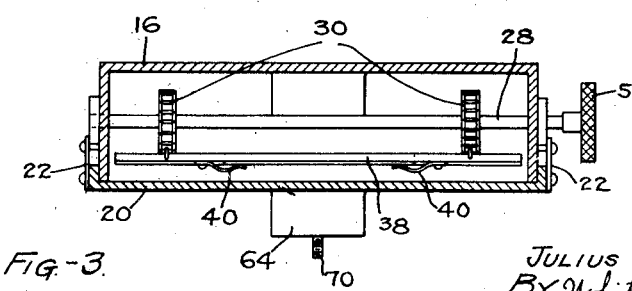
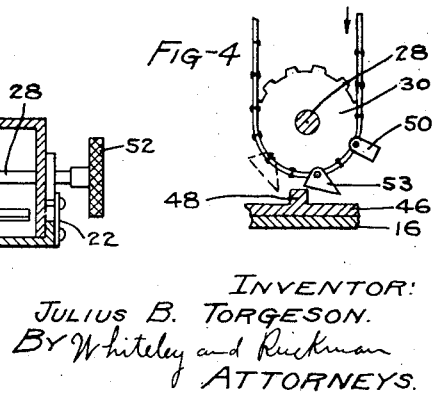
INVENTOR:
JULIUS B. TORGESON.
BY Whiteley and Ruckman
ATTORNEYS.

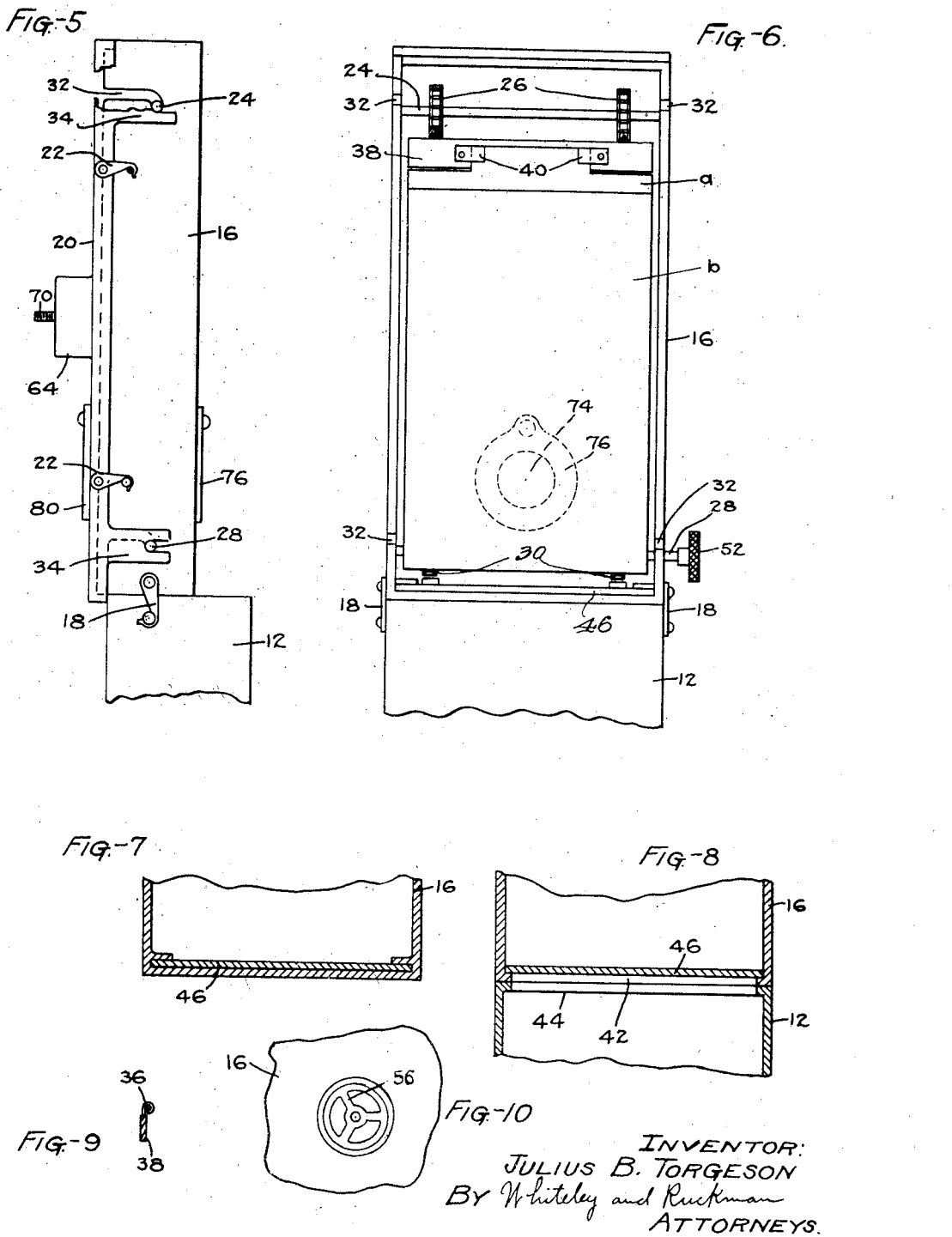

Patented Oct. 10, 1922.

1,431,851

UNITED STATES PATENT OFFICE.

JULIUS B. TORGESON, OF MINNEAPOLIS, MINNESOTA.

ATTACHMENT FOR FILM-PACK CAMERAS.

Application filed September 1, 1920. Serial No. 407,525.

*To all whom it may concern:*

Be it known that I, JULIUS B. TORGESON, a citizen of the United States, residing at the city of Minneapolis, in the county of Hennepin and State of Minnesota, have invented certain new and useful Improvements in Attachments for Film-Pack Cameras, of which the following is a specification.

My invention relates to attachments for film pack cameras, and an object is to provide a light-tight casing or tank which can be readily attached to a camera of this character in such manner that one or more exposed films may be readily transferred from the film pack contained in the camera into such casing or tank without the use of a dark room. Another object is to provide a device of this character in which the opening into the casing through which the film is moved will be closed as soon as the film has been completely transferred so that the attachment may then be detached without liability of the transferred film becoming light struck. Another object is to provide a device of this character which, when detached from the camera, may be used as a developing, washing and fixing tank for making negatives from exposed films contained therein. Another object is to provide a device of this character embodying a casing and a cover and in which a transferring mechanism is held in place by the cover and may be readily removed when the cover is taken off so that both the casing and the cover may be used as trays. Another object is to provide a device of this character which is compact so that it does not require much space.

The full objects and advantages of my invention will appear in connection with the detailed description thereof, and the novel features embodied in my inventive idea will be particularly pointed out in the claims.

In the accompanying drawings which illustrate the application of my invention in one form,—

Fig. 1 is a view showing the device in vertical section broken away at its middle and applied to a film pack camera, the latter being partly in side elevation and partly in vertical section. Fig. 2 is a view in vertical section showing the operating mechanism in a different position from that shown in Fig. 1. Fig. 3 is a horizontal section on the line 3—3 of Fig. 2. Fig. 4 is a sectional detail view showing the lower portion of the operating mechanism in a still different position. Fig. 5 is a side elevational view of the device partly broken away at the top. Fig. 6 is a rear elevational view with the cover removed and a film pulled up into the device. Fig. 7 is a sectional detail view on the line 7—7 of Fig. 1. Fig. 8 is a sectional detail view on the line 8—8 of Fig. 1; Fig. 9 is a detail view showing a clamping device attached to a sprocket link; Fig. 10 is a fragmentary plan view showing a valve opening.

Referring to the particular construction shown in the drawings, the numeral 12 designates a film pack camera in its entirety, the rear of the same being adapted to receive a film pack 14, as indicated in Fig. 1. My attachment includes a casing 16 which carries hooks 18 at the lower portions of its opposite sides for securing the attachment to the camera above the film pack when the latter is in position therein. A cover 20 is adapted to be secured to the rear of the casing 16 by hooks 22. This cover fits the casing with a tight joint 23. As will appear later on, the casing 16 and the cover 20 form a light-tight developing, washing and fixing tank susceptible for such uses when removed from the camera. The tank may be of any suitable size but is preferably about one-half the thickness of the camera when folded. Within the tank is an operating mechanism which will now be described, by means of which one or more of the exposed films contained in the film pack at the back of the camera may be pulled up into the tank without exposure to light. Mounted on an upper shaft 24 are a pair of sprocket wheels 26, and mounted on a lower shaft 28 are a pair of sprocket wheels 30. The shafts 24 and 28 when in use lie within the downwardly turned ends of bayonet slots 32 with which the casing is provided and are held in position by means of lugs 34 on the cover having slots at their free ends in which the ends of the shafts fit. Upon removal of the cover, it is obvious that the shafts and a pair of endless sprocket chains 36 carried by the sprocket wheels may be readily removed from the casing so that the latter may be employed as a tray or open top receptacle. Attached to the pair of chains 36 is a transverse bar 38 provided with a pair of clips 40. In the bottom of the casing 16 is a slot 42 which, when the device is attached to a camera in the manner previously described, is in register with a slot 44 through which the film pack is inserted into the camera. The slot 42 may be covered by a sliding door 46 operable in a slideway, as shown in Fig. 7, and having an upwardly projecting lug 48 by means of which it is operated in the following manner. Attached to the pair of sprocket chains is a transverse bar 50 so positioned that when the sprocket chains are moved by turning a milled knob 52 secured to the shaft 28 from the position shown in Fig. 1 to the position shown in Fig. 2 to draw the exposed films into the casing 16, the door will be closed by engagement of the bar 50 with the lug 48 just after the film has been completely transferred into the casing. Slightly ahead of the transverse bar 50 and pivotally attached to the pair of sprocket chains is a wedge-shaped transverse bar 53 which, when the chains are moving in the direction of the arrow as indicated in Fig. 4 will pass over the lug 48 without operating the door. But when the chains are turned in the opposite direction the depending corner of this bar will engage the lug 48 and slide the door 46 into its open position as shown in Fig. 1. The front of the casing 16 has an inwardly extending recess limited by a wall provided with a hole 54. The outer end of this recess is partly closed by a spider 56, the center of which has a screw threaded hole to receive the screw-threaded stem 58 of a light-tight valve 60 adapted to cooperate with a valve seat 62 to make the casing liquid-tight. The cover 20 has an outwardly extending recess formed by a circular flange 64, this recess communicating through the cover by means of a hole 66. The outer end of this recess is partly closed by a spider 68 similar to the spider 56 and the center of which has a screw-threaded hole to receive the screw-threaded stem 70 of a light-tight valve 72 adapted to cooperate with a valve seat 73 to make the cover liquid-tight. The front wall of the casing 16 may be provided with a countersunk hole to receive a disc 74 of red glass or other transparent material held in place by an annulus 76. The cover 20 may similarly be provided with a countersunk hole to receive a similar disc 78 held in position by an annulus 80. These two discs are in register in order that the interior of the casing may be observed when the cover is in position.

The operation and advantages of my invention will be readily understood from the foregoing description when it is explained that the film pack is so arranged that the films can be pulled all of the way out of the pack, and that the customary black paper can be pulled out and torn off before the film is transferred to the attachment, a short piece of paper designated by the character "a" being left attached to the film "b," as best shown in Fig. 6. This operation is, of course, performed before the attachment is placed on the camera. When the casing 16 has been attached to the camera, one or more of the pieces of paper "a" according to the number of films which have been exposed, will project up through the slot 42 as shown in Fig. 1, the door 46 being then in open position. The door may be opened by turning the knob 52 in reverse direction to cause the pivoted bar 53 to move backwardly from the dotted position as shown in Fig. 4. When the cover 20 is removed, the pieces of paper "a" may be gripped by engaging them with the clips 40. The cover is then replaced and upon turning the knob 52 in forward direction the film will be pulled up into the casing and when completely transferred, the bar 50 will cause the door to close. The attachment is then removed from the camera and the latter is again ready for making exposures. The film in the casing may be subjected to the action of a developing solution which is introduced past one of the valves such as the valve 60 when in the position shown in Fig. 2 and raised from the valve seat 62 into engagement with the stop 63, the latter being separated by intervening spaces so that the solution may flow past. On turning the stem 58 which may be turned for instance by means of a screw driver the valve is seated so as to make the casing liquid-tight. Both valves being closed, the film is subjected for the proper length of time to the action of the developer. The progress of this action may be observed through the colored discs 74 and 78. When the film has been sufficiently developed, a valve is opened and the developing solution poured out. Water for washing the film is then introduced into the casing, and if desired a stream of water may be forced through the casing when both valves are open. After the film has been washed, a fixing solution is then introduced into the casing in the manner similar to the developing solution. When the film has been fixed, it may be readily taken out of the casing upon removal of the cover. It will be apparent that by the use of my attachment it is an easy matter to develop and fix one or more films immediately after they have been exposed without the necessity of using a dark room. Two small tanks may be provided for carrying the developing solution and the fixing solution. The operating mechanism in the casing may be readily removed when the cover is taken off so that both the casing and cover may be used as trays.

I claim:

1. An attachment for film pack cameras comprising a light-tight casing, means for attaching said casing to the back of a camera above the customary film pack opening therein, and operating mechanism in said casing adapted to transfer exposed film from the camera to said casing.

2. An attachment for film pack cameras comprising a light-tight casing having a controllable opening, means for attaching said casing to the back of a camera, operating mechanism in said casing adapted to transfer exposed film from the camera to said casing, a closure for the opening in said casing through which the film is transferred, and means associated with said operating mechanism for moving said closure into closing position when the film has been completely transferred.

3. An attachment for film pack cameras comprising a light-tight casing having a controllable opening, means for attaching said casing to the back of a camera, operating mechanism in said casing adapted to transfer exposed film from the camera to said casing, a closure for the opening in said casing through which the film is transferred, means associated with said operating mechanism for moving said closure into closing position when the film has been completely transferred, means also associated with said operating mechanism for moving said closure into open position when said operating mechanism is reversely operated.

4. An attachment for film pack cameras comprising a light-tight casing, means for attaching said casing to the back of a camera, operating mechanism in said casing adapted to transfer exposed film from the camera to said casing, a cover for said casing, and means associated with said cover for holding said operating mechanism in place and which permits removal of the same from said casing upon removal of said cover.

5. An attachment for film pack cameras comprising a light-tight casing, means for attaching said casing to the rear portion of a camera, a gripping member in said casing, and means whereby said gripping member may be moved longitudinally in said casing to transfer exposed film from the camera to said casing.

6. An attachment for film pack cameras comprising a light-tight casing, means for attaching said casing to the rear portion of a camera, wheels mounted in said casing, a pair of flexible members extending around said wheels, a gripping member attached to said flexible members, and means whereby said flexible members may be operated to transfer exposed film from the camera to said casing.

7. An attachment for film pack cameras comprising a light-tight casing having a controllable opening, means for attaching said casing to the rear portion of a camera, wheels mounted in said casing, a pair of flexible members extending around said wheels, a gripping member attached to said flexible members, means whereby said flexible members may be operated to transfer exposed film from the camera to said casing, a closure for the opening in said casing through which the film is transferred, and means carried by said flexible members for moving said closure into closing position when the film has been completely transferred.

8. An attachment for film pack cameras comprising a light-tight casing having a controllable opening, means for attaching said casing to the rear portion of a camera, two pairs of sprocket wheels mounted in said casing, a pair of sprocket chains extending around said wheels, a gripping member attached to said sprocket chains, a knob secured to the shaft of one pair of sprocket wheels whereby said chains may be operated to transfer film from the camera to said casing, a slidable door for the opening in said casing through which the film is transferred, a bar attached to said chains in such position as to move said door into closing position when the film has been completely transferred, and a bar pivoted to said chains in such manner as to open said door when said knob is turned in reverse direction.

9. An attachment for film pack cameras comprising a light-tight casing, means for attaching said casing to the rear portion of a camera above the customary film pack opening therein, operating mechanism in said casing adapted to transfer exposed film from the camera to said casing, and means whereby developing solution may be introduced into said casing while preventing light from reaching the film contained therein.

In testimony whereof I hereunto affix my signature.

JULIUS B. TORGESON.